(12) United States Patent
Mikawa (10) Patent No.: US 7,643,065 B2
(45) Date of Patent: Jan. 5, 2010

(54) IMAGE DATA PROCESSING SYSTEM (75) Inventor: Takuma Mikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 10/831,226

(22) Filed: Apr. 26, 2004

(65) Prior Publication Data

US 2004/0196502 A1  Oct. 7, 2004

(30) Foreign Application Priority Data

May 7, 2003  (JP) ............................. 2003-129045

(51) Int. Cl.
*H04N 5/232*  (2006.01)
*H04N 5/25*  (2006.01)
*H04N 7/14*  (2006.01)
*G06F 7/00*  (2006.01)
*G06F 17/00*  (2006.01)
*G06F 17/30*  (2006.01)
*G06F 15/00*  (2006.01)
*G06K 1/00*  (2006.01)
*G06F 3/12*  (2006.01)
*H04N 1/00*  (2006.01)
*H04N 1/40*  (2006.01)
*G06F 3/00*  (2006.01)
*G06F 15/177*  (2006.01)

(52) U.S. Cl. ........................... 348/211.99; 348/207.11; 348/14.03; 707/10; 707/102; 358/1.9; 358/1.15; 358/403; 358/401; 358/448; 715/704; 715/734; 715/740; 715/744; 715/748

(58) Field of Classification Search .................. 710/14; 715/853, 500.1, 756, 723, 719, 740, 838, 715/501.1, 716, 781, 500; 434/362; 726/17; 341/175, 21; 379/88.17; 348/586, 143, 231.2, 348/333.05, 734, 722, 207.2, 14.08, 231.99, 348/207.1, 211.14, 211.3, 207.11, 207.99; 707/104.1, 3, 501.1; 725/105, 110; 709/203, 709/225, 201; 345/668, 810, 783, 473, 535; 382/128, 236, 103, 111, 100; 386/112, 95; 705/10, 1, 35; 340/506; 385/125; 700/213; 600/300; 455/414.1; 396/427; 358/1.15, 358/1.16, 1.13, 453, 1.18

See application file for complete search history.

(56) References Cited

U.S. PATENT DOCUMENTS 5,920,317 A * 7/1999 McDonald .................. 715/853
5,926,650 A * 7/1999 Suzuki et al. ................. 710/14
5,978,648 A * 11/1999 George et al. ............... 434/362

(Continued)

FOREIGN PATENT DOCUMENTS

CN  1554183  12/2004

(Continued)

*Primary Examiner*—Twyler L Haskins
*Assistant Examiner*—Jonathan R Beckley
(74) *Attorney, Agent, or Firm*—Fitzpatrick, Cella, Harper & Scinto (57) ABSTRACT

In a system having a server and a client apparatus, the client apparatus edits image data by using a representative image of the image data stored in the server, generates play list data indicating the order of reproducing the image data, in accordance with the editing results, and the server stores the image data sent from the client apparatus, reproduces the stored image data in accordance with the play list data sent from the client, and transmits the reproduced image data to the server.

11 Claims, 5 Drawing Sheets

U.S. PATENT DOCUMENTS

| | | | | |
|---|---|---|---|---|
| 6,005,560 A * | 12/1999 | Gill et al. | | 715/205 |
| 6,035,323 A * | 3/2000 | Narayen et al. | | 709/201 |
| 6,067,624 A * | 5/2000 | Kuno | | 726/17 |
| 6,104,334 A * | 8/2000 | Allport | | 341/175 |
| 6,233,318 B1 * | 5/2001 | Picard et al. | | 379/88.17 |
| 6,236,395 B1 * | 5/2001 | Sezan et al. | | 715/723 |
| 6,237,025 B1 * | 5/2001 | Ludwig et al. | | 709/204 |
| 6,256,061 B1 * | 7/2001 | Martin et al. | | 348/222.1 |
| 6,288,753 B1 * | 9/2001 | DeNicola et al. | | 348/586 |
| 6,301,586 B1 * | 10/2001 | Yang et al. | | 707/104.1 |
| 6,332,146 B1 * | 12/2001 | Jebens et al. | | 707/104.1 |
| 6,335,742 B1 * | 1/2002 | Takemoto | | 715/781 |
| 6,353,823 B1 * | 3/2002 | Kumar | | 707/3 |
| 6,353,848 B1 * | 3/2002 | Morris | | 709/203 |
| 6,400,375 B1 * | 6/2002 | Okudaira | | 345/668 |
| 6,522,418 B2 * | 2/2003 | Yokomizo et al. | | 358/1.15 |
| 6,535,243 B1 * | 3/2003 | Tullis | | 348/207.1 |
| 6,570,585 B1 * | 5/2003 | Hines et al. | | 715/716 |
| 6,573,907 B1 * | 6/2003 | Madrane | | 715/719 |
| 6,577,311 B1 * | 6/2003 | Crosby et al. | | 345/428 |
| 6,675,386 B1 * | 1/2004 | Hendricks et al. | | 725/105 |
| 6,697,569 B1 * | 2/2004 | Gomez et al. | | 386/120 |
| 6,715,003 B1 * | 3/2004 | Safai | | 710/33 |
| 6,728,753 B1 * | 4/2004 | Parasnis et al. | | 709/203 |
| 6,748,446 B2 * | 6/2004 | Sato et al. | | 709/241 |
| 6,757,684 B2 * | 6/2004 | Svendsen et al. | | 707/10 |
| 6,760,128 B2 * | 7/2004 | Jackson et al. | | 358/453 |
| 6,760,884 B1 * | 7/2004 | Vertelney et al. | | 715/202 |
| 6,760,916 B2 * | 7/2004 | Holtz et al. | | 725/34 |
| 6,763,377 B1 * | 7/2004 | Belknap et al. | | 709/223 |
| 6,784,925 B1 * | 8/2004 | Tomat et al. | | 348/207.11 |
| 6,789,105 B2 * | 9/2004 | Ludwig et al. | | 709/204 |
| 6,789,228 B1 * | 9/2004 | Merril et al. | | 715/243 |
| 6,801,663 B2 * | 10/2004 | Matsushita et al. | | 382/236 |
| 6,821,034 B2 * | 11/2004 | Ohmura | | 400/76 |
| 6,833,848 B1 * | 12/2004 | Wolff et al. | | 715/719 |
| 6,842,107 B2 * | 1/2005 | Takemura et al. | | 340/286.02 |
| 6,870,555 B2 * | 3/2005 | Sekiguchi | | 715/740 |
| 6,871,231 B2 * | 3/2005 | Morris | | 709/225 |
| 6,876,382 B1 * | 4/2005 | Sakamoto | | 348/207.2 |
| 6,877,031 B2 * | 4/2005 | Watanabe et al. | | 709/224 |
| 6,882,299 B1 * | 4/2005 | Allport | | 341/176 |
| 6,882,793 B1 * | 4/2005 | Fu et al. | | 386/95 |
| 6,895,407 B2 * | 5/2005 | Romer et al. | | 707/104.1 |
| 6,919,900 B2 * | 7/2005 | Wilt | | 345/535 |
| 6,934,048 B2 * | 8/2005 | Igarashi et al. | | 358/1.15 |
| 6,950,800 B1 * | 9/2005 | McIntyre et al. | | 705/1 |
| 6,967,675 B1 * | 11/2005 | Ito et al. | | 348/207.1 |
| 6,973,200 B1 * | 12/2005 | Tanaka et al. | | 382/103 |
| 6,976,229 B1 * | 12/2005 | Balabanovic et al. | | 715/838 |
| 7,010,144 B1 * | 3/2006 | Davis et al. | | 382/100 |
| 7,011,230 B2 * | 3/2006 | Seo | | 221/1 |
| 7,027,171 B1 * | 4/2006 | Watanabe | | 358/1.15 |
| 7,046,269 B2 * | 5/2006 | Parker et al. | | 348/14.08 |
| 7,058,689 B2 * | 6/2006 | Parker et al. | | 709/206 |
| 7,068,190 B2 * | 6/2006 | Satomi et al. | | 341/22 |
| 7,075,572 B2 * | 7/2006 | Kinjo | | 348/231.99 |
| 7,077,806 B2 * | 7/2006 | Ackermann et al. | | 600/300 |
| 7,092,010 B2 * | 8/2006 | Iida | | 348/207.1 |
| 7,131,059 B2 * | 10/2006 | Obrador | | 715/209 |
| 7,165,224 B2 * | 1/2007 | Phyalammi | | 715/748 |
| 7,173,651 B1 * | 2/2007 | Knowles | | 348/207.1 |
| 7,174,512 B2 * | 2/2007 | Martin et al. | | 715/719 |
| 7,184,047 B1 * | 2/2007 | Crampton | | 345/473 |
| 7,190,810 B2 * | 3/2007 | Tanaka et al. | | 382/103 |
| 7,194,253 B2 * | 3/2007 | Ritter et al. | | 455/414.1 |
| 7,197,448 B2 * | 3/2007 | Fujisawa et al. | | 705/35 |
| 7,210,863 B2 * | 5/2007 | Nakamura | | 396/427 |
| 7,212,731 B1 * | 5/2007 | Morotomi et al. | | 386/95 |
| 7,246,147 B2 * | 7/2007 | Kim et al. | | 709/203 |
| 7,248,231 B2 * | 7/2007 | Hurley et al. | | 345/2.1 |
| 7,257,549 B2 * | 8/2007 | Karaoguz et al. | | 705/26 |
| 7,265,780 B2 * | 9/2007 | Tanaka et al. | | 348/207.99 |
| 7,284,040 B2 * | 10/2007 | Kobayashi et al. | | 709/219 |
| 7,293,060 B2 * | 11/2007 | Komsi | | 709/203 |
| 7,315,386 B1 * | 1/2008 | Shiimori et al. | | 358/1.15 |
| 7,336,775 B2 * | 2/2008 | Tanaka et al. | | 379/93.17 |
| 7,391,967 B2 * | 6/2008 | Shizukuishi | | 396/321 |
| 7,433,916 B2 * | 10/2008 | Satomi et al. | | 709/203 |
| 7,444,354 B2 * | 10/2008 | Kaburagi et al. | | 707/104.1 |
| 7,464,110 B2 * | 12/2008 | Pyhalammi et al. | | 707/104.1 |
| 7,487,155 B2 * | 2/2009 | Jebens et al. | | 707/10 |
| 7,505,674 B2 * | 3/2009 | Mikawa | | 386/95 |
| 2001/0032335 A1 * | 10/2001 | Jones | | 725/105 |
| 2002/0051181 A1 * | 5/2002 | Nishimura | | 358/1.15 |
| 2002/0069218 A1 * | 6/2002 | Sull et al. | | 707/501.1 |
| 2002/0140724 A1 * | 10/2002 | Qureshi et al. | | 345/730 |
| 2002/0140978 A1 * | 10/2002 | Urabe et al. | | 358/1.16 |
| 2002/0167522 A1 * | 11/2002 | Miyazawa | | 345/530 |
| 2002/0180803 A1 * | 12/2002 | Kaplan et al. | | 345/810 |
| 2003/0014475 A1 * | 1/2003 | Komori | | 709/200 |
| 2003/0058353 A1 * | 3/2003 | Tsue | | 348/231.2 |
| 2003/0059202 A1 * | 3/2003 | Yoda | | 386/69 |
| 2003/0093790 A1 * | 5/2003 | Logan et al. | | 725/38 |
| 2003/0181199 A1 * | 9/2003 | Yamaguchi et al. | | 455/414.1 |
| 2003/0184653 A1 * | 10/2003 | Ohkubo | | 348/207.1 |
| 2004/0160634 A1 * | 8/2004 | Watanabe | | 358/1.15 |
| 2005/0146621 A1 | 7/2005 | Tanaka et al. | | 348/211.2 |

FOREIGN PATENT DOCUMENTS

| | | |
|---|---|---|
| JP | 2002-51241 | 2/2002 |
| WO | WO 03/024094 A1 | 3/2003 |

\* cited by examiner

IMAGE DATA PROCESSING SYSTEM

BACKGROUND OF THE INVENTION

1. Field of the Invention

The present invention relates to an image data processing system, and more particularly to a system for processing image data via a transmission path such as a network.

2. Related Background Art

In a conventional image data editing process, image data is generally stored in a local area of an editing apparatus to be processed. For example, in the image editing process by a personal computer (PC), image data stored in a hard disk of PC is generally processed.

Similar image processing is performed not only by a general apparatus such as PC but also by an image photographing apparatus such as a digital camera, a digital video camera and the like. For example, when image editing is performed with a digital camera having an image editing function, image data stored in a recording medium of the digital camera is processed.

As described in Japanese Patent Application Laid-open No. 2002-51241, image data is uploaded to a server on a network to manage it, while the image data is not managed in a local recording area.

It is very serious to edit moving images with an apparatus having a relatively low processing ability such as a digital camera. Therefore, the image editing by the digital camera is limited to a simple process so that it is difficult to realize complicated image editing from the viewpoint of performance and cost.

As described in the above-cited Japanese Patent Application Laid-open No. 2002-51241, if photographed image data uploaded to the server is managed and when the image data at the server is required to be edited, it is necessary to download the image data once into a local recording area before editing it. The downloaded image data is thereafter edited, and it is therefore necessary to upload the edited image data back to the server. Even if the image data at the server is required only to be looked at, it is basically necessary to download an image file.

Moving image data in particular cannot be reproduced until it is completely downloaded.

An image recording system has been proposed recently in which a wireless network function is added to a digital camera and photographed image data is automatically transmitted to the server without storing it in the digital camera.

In such a system, since image data is not left stored on a recording medium of the digital camera, it is very difficult to edit image data by using the digital camera.

SUMMARY OF THE INVENTION

It is an object of the present invention to solve the above problems.

It is another object of the present invention to realize an editing process using complicated imaging effects even for an apparatus having no highly sophisticated image processing ability such as a digital camera.

In order to achieve the above objects, according to an aspect of the present invention, an image processing system of the present invention, for processing image data between a server and a client apparatus, is arranged so that the client apparatus comprises: communication processing means for transmitting the image data to the server via a transmission path to make the image data be stored in the server and receiving the image data from the server; and control means for generating play list data representative of an order of reproducing the image data, by using representative image data representative of an representative image of the image data, and transmitting the play list data to the server via the communication processing means, and the server comprises a transceiver unit for receiving the image data and the play list data transmitted from the client apparatus, a generation unit for generating the representative image data representative of the representative image of the received image data and a storage unit for storing the received image data and the representative image data, wherein in response to an instruction from the client apparatus, the server transmits the generated representative image data to the client apparatus, reproduces the image data stored in the storage unit in accordance with the received play list data, and transmits the reproduced image data to the client apparatus.

Other features and advantages of the present invention will become apparent from the following detailed description of embodiments taken in conjunction with the accompanying drawings.

DETAILED DESCRIPTION OF THE PREFERRED EMBODIMENTS

Embodiments of the present invention will be described in detail with reference to the accompanying drawings.

In one embodiment, an image photographing apparatus having a communication means for communication with a wireless base station as a means for establishing communication between a server and the image photographing apparatus will be described. The image photographing apparatus itself may not have a communication means, but a portable terminal capable of communicating with a wireless base station is connected to the image photographing apparatus to communicate with the wireless base station. In this embodiment, although the wireless base station for portable terminals is used, other wireless technologies may also be used. For example, wireless local area networks (LAN), Bluetooth or the like may also be used.

Figure 2:
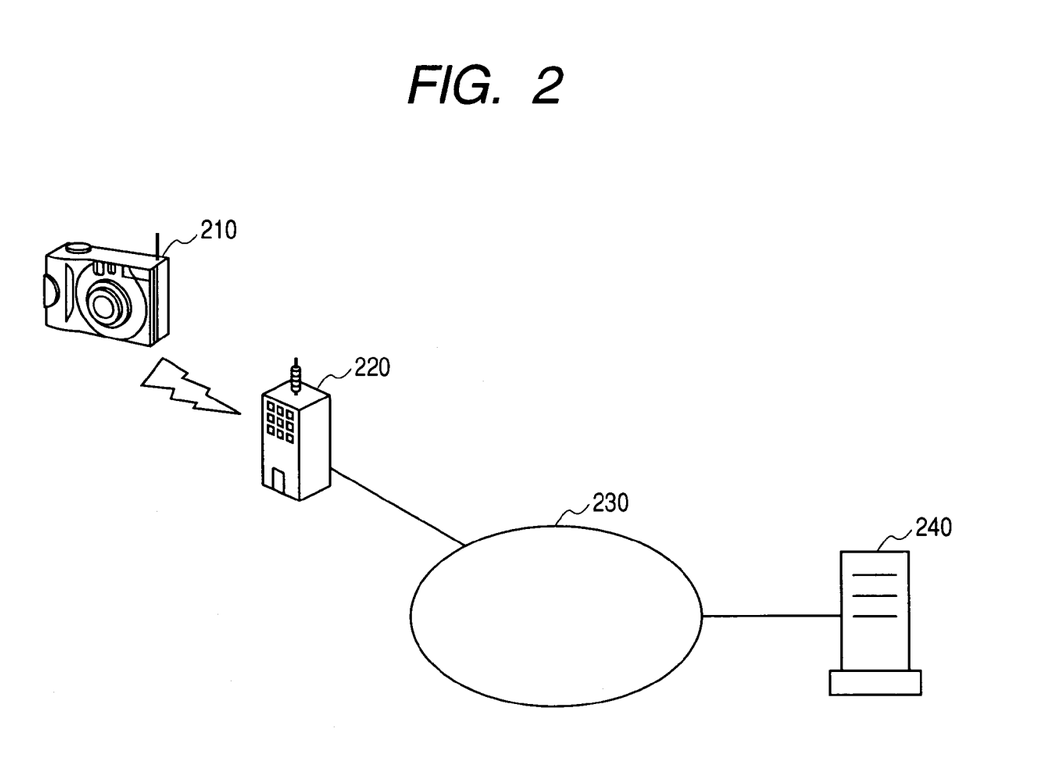
FIG. 2 is a diagram showing the configuration of a system to which the present invention is applied.

FIG. 2 is a diagram showing the outline of the whole image processing system to which the present invention is applied.

As shown in FIG. 2, the system of this embodiment is constituted of an image photographing apparatus 210, a wireless base station 220, the Internet 230 and a server 240. The image photographing apparatus 210 and wireless base station 220 are interconnected through radio communication. The wireless base station 220 and server 240 are interconnected by a data communication network 230 such as the Internet.

A data communication process using a portable terminal will be described briefly.

A portable terminal frequently communicates with a nearby wireless base station even if it is not in a speech mode. During this communication, an identification signal of the portable terminal is transmitted to the wireless base station. In this manner, it is possible to obtain corresponding between a plurality of distributed wireless base stations and a plurality of portable terminals, and this correspondence information is registered in a managing station which manages all the wireless base stations. With this configuration, for example, when a portable terminal is to be called from another portable terminal, the managing station searches a nearby wireless base station in accordance with the identification signal of the other portable terminal and connects a line to the searched wireless base station to allow speech. Since each portable terminal is related to the nearby wireless base station, the position of the portable terminal can be known from the position of the wireless base station. The portable terminal is presently used not only for speech but also various information communications.

The image photographing apparatus 210 of this embodiment has a built-in portable terminal, and can transmit and receive various types of data by using the wireless base stations for portable terminals.

With this configuration, when the image photographing apparatus 210 photographs an image, the image data is transmitted to the server 240.

If the image data cannot be transmitted when the image is photographed, the photographed image data is once stored in a recording medium mounted on the image photographing apparatus 210, and when the image data transmission enable state is recovered, the image data is transmitted to the server 240. Thereafter, the image photographing apparatus 210 deletes the image data already transmitted from the recording medium.

When the server 240 receives the image data from the image photographing apparatus 210, the server 240 generates thumbnail image data representative of the received image data, and stores the image data and thumbnail data in one-to-one correspondence in a storage unit built-in the server.

When the image is to be edited by the image photographing apparatus 210, all the thumbnail image data stored in the server 240 is downloaded and a list of thumbnail images is displayed and shown to a user.

By referring to the displayed thumbnail image list, the user performs play list editing by setting a reproduction order of a plurality of images, the display effects at the time of reproduction and the like. Play list data is the data describing the reproduction order of image data and is generated by using metadata added to the thumbnail image or the like. The format of the play list may be a general one such as Synchronized Multimedia Integration Language (SMIL) or may be a special format.

In response to the completion of play list editing, the generated play list data is transmitted from the image photographing apparatus 210 to the server 240 which stores it. After the play list data is stored in the server 240, the play list data is displayed in the thumbnail list, similar to other image data stored in the server.

After the image photographing apparatus 210 selects the thumbnail image from the displayed thumbnail list for reproduction purposes, the image photographing apparatus 210 transmits a reproduction instruction of the image data corresponding to the selected thumbnail image to the server 240, and the server 240 reproduces the selected image data and transmits it to the image photographing apparatus 210.

When the image photographing apparatus 210 instructs the reproduction of play list data, it transmits a start instruction of reproduction following the play list to the server 240. In accordance with the contents of the play list data, the server 240 reproduces the image data stored in the storage unit and transmits it to the image photographing apparatus 210 to allow the image photographing apparatus to reproduce and display the image data matching the play list.

Figure 3:
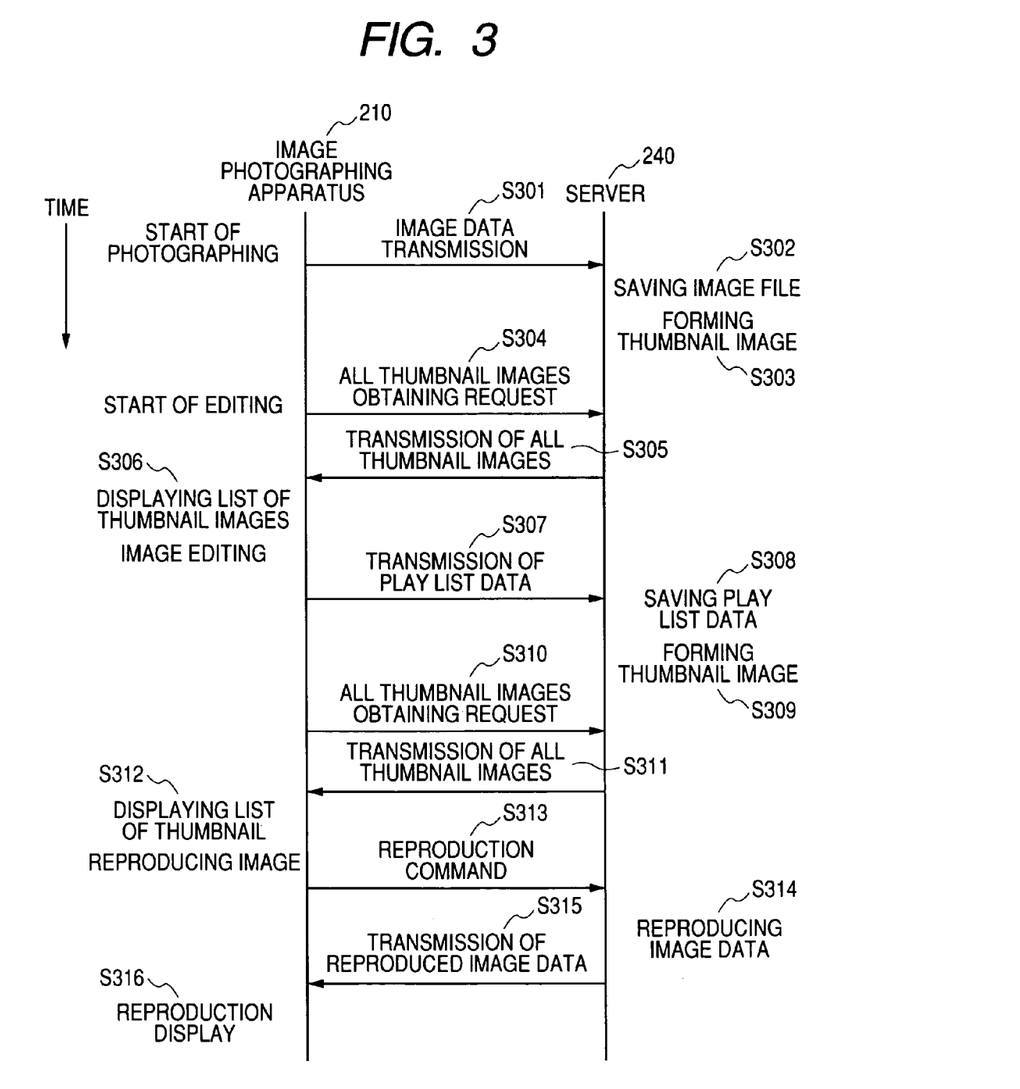
FIG. 3 is a diagram illustrating communication between an image processing apparatus and a server.

FIG. 3 is a flow chart illustrating a photographing and editing process to be executed between the image photographing apparatus 210 and server 240. This flow chart pays attention to the data exchange between the image photographing apparatus 210 and server 240 so that communication means and the like are shown omitted.

First, after an image is photographed with the image photographing apparatus 210, the photographed image data is transmitted to the server 240. This process is Step S301.

Upon reception of the image data, the server 240 stores the received image data along with the additional information such as its file name (identification information), generates thumbnail image data of the received image data, and stores it with reference to the received original image data. In this case, if the original image data is data of a still image, the still image is subjected to a reduction process to generate the thumbnail image data, whereas if the original image data is data of a moving image, image data of the start frame is subjected to a reduction process to generate the thumbnail image data. Metadata such as a file name (identification information) of the original image data from which the thumbnail image data was generated, a moving image recording time and image size information is added to the thumbnail image data and stored. These processes are Steps S302 and S303.

Steps S301 to S303 are the processes to be executed each time the photographing apparatus 210 photographs an image.

Next, in order to edit an image photographed with the image photographing apparatus 210, a user sets an editing mode of the image photographing apparatus. Upon instruction of the editing mode, the image photographing apparatus 210 sends a thumbnail image acquisition request to the server 240 in order to display the thumbnail image list of images photographed with the image photographing apparatus 210. This process is Step S304.

Upon reception of the thumbnail image acquisition request, the server 240 sends the thumbnail image data of all image data stored and the thumbnail image data of the play list data to the image photographing apparatus 210. This process is Step S305. At this time, additional information of each thumbnail image data is also transmitted.

Upon reception of the thumbnail image data, the image photographing apparatus 210 displays the thumbnail image list. This process is Step S306.

By referring to the displayed thumbnail images, a user edits the image. The image editing results are stored in the image photographing apparatus 210 as play list data. Particular examples of the screen layout and an operation method for image editing will be later described.

When the image editing operation is completed, the image photographing apparatus 210 transmits the play list data as the editing results to the server 240. This process is Step S307.

Upon reception of the play list data, the server 240 stores the play list data along with the additional information such as identification information in the built-in storage unit, and generates the thumbnail image data of the play list data. Specifically, the contents of the received play list data are checked, and one frame of image data designated as the first of the reproduction order is used as the thumbnail image data. These processes are Steps S308 and S309.

In case that the image data and the play list as the editing results stored in the server are to be reproduced after the image photographing apparatus 210 transmits the play list data to the server 240, the image photographing apparatus 210 sends the thumbnail image acquisition request to the server 240. This process is Step S310.

Upon reception of the thumbnail image acquisition request, the server 240 sends the thumbnail image data of all image data and play list data stored in the server 240 to the image photographing apparatus 210. This process is Step S311.

Upon reception of the thumbnail image data, the image photographing apparatus 210 displays the thumbnail image list. This process is Step S312.

After the image photographing apparatus 210 selects a desired thumbnail image from the displayed thumbnail list for reproduction purposes, the image photographing apparatus 210 sends to the server 240 a reproduction command and the identification information of the original image data corresponding to the designated thumbnail image or the identification information of the play list data. This process is Step S313.

Upon reception of the reproduction command and identification information of the image data, the server 240 selects the designated data from a number of stored image data files and stored play list data files, in accordance with the identification information, and reproduces the image data in accordance with the reproduction command. For example, if the thumbnail image of image data is designated, image data corresponding to the designated thumbnail image is reproduced.

If the thumbnail image of a play list is designated, the server reproduces the play list data corresponding to the identification information of the play list data corresponding to the designated thumbnail image. The contents of the play list data are checked and the stored image data is reproduced in accordance with the procedure designated in the play list. This process is Step S314.

After the image data corresponding to the designated thumbnail image is reproduced, the server 240 transmits it to the image photographing apparatus 210. This process is Step S315.

Upon reception of the image data transmitted from the server 240, the image photographing apparatus 210 displays the image data. This process is Step S316.

By executing the above-described processes, it is possible to edit and reproduce photographed images even if the image data is not stored in the image photographing apparatus 210. Since the actual reproduction process is performed by the server in accordance with the image editing results, the image photographing apparatus is not required to have a high image processing ability, for example, even in case that a sophisticated effect process is to be performed.

Further, since the editing results are stored in the server 240 as the play list data, even another portable terminal different from the image photographing apparatus 210 can confirm the editing results of the image data stored in the server 240, by connecting to the server 240 via the network 220, downloading the thumbnail image of the play list as described with reference to FIG. 3, and thereafter instructing the reproduction of the play list.

Therefore, for example, in case that the editing results of photographed images at an event such as a wedding ceremony are to be publicized to other users, the reproduced images of the similar editing results can be acquired independently from the ability of portable terminals possessed by other users.

Figure 1:
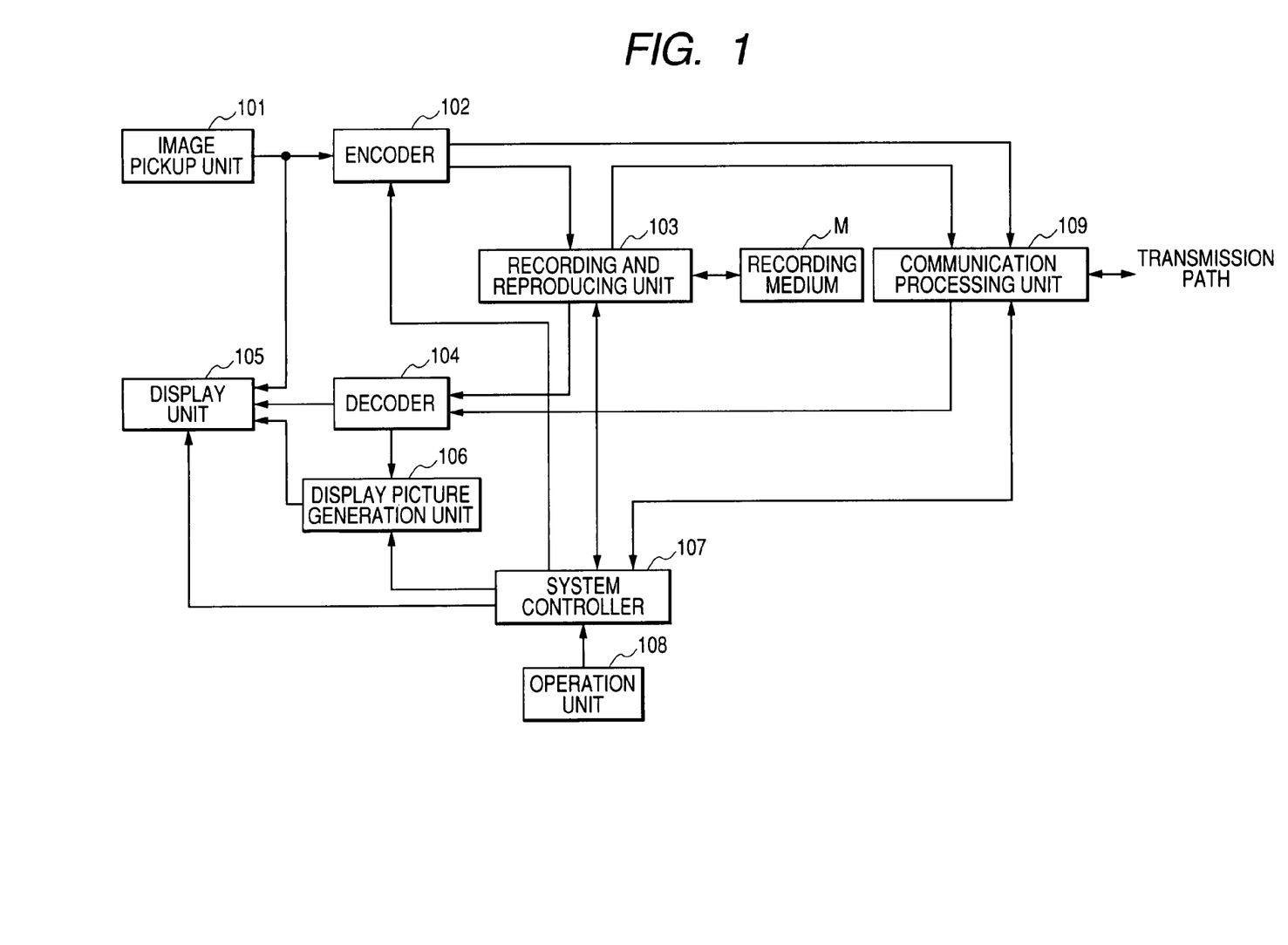
FIG. 1 is a block diagram showing the structure of an image photographing apparatus to which the present invention is applied.

Next, the internal structure and operation of the image photographing apparatus 210 will be described. FIG. 1 is a block diagram showing the structure of the image photographing apparatus 210.

In FIG. 1, an image pickup unit 101 converts an optical image of an object into an electrical signal, performs various necessary processes and outputs the results. An encoder 102 compression-encodes the image data supplied from the image pickup unit 101, by using the MPEG scheme or the like. A recording and reproducing unit 103 records and reproduces encoded image data onto and from a recording medium M. In this embodiment, the recording medium is a random accessible recording medium such as a disc medium and a memory card.

A decoder 104 decodes the image data reproduced by the recording and reproducing unit 103 or image data received by a communication processing unit 109, and expands the information amount of the decoded image data. A display unit 105 displays an image of the image data supplied from the image pickup unit 101, decoder 104 and a display picture generation unit 106, in accordance with an instruction from a system controller 107. The system controller 107 controls the operation of each unit in accordance with an instruction from an operation unit 108, and generates the play list data as will be described later, the system controller having a microcomputer. The operation unit 108 is made of an operation panel, a remote controller and the like. The communication processing unit 109 transmits and receives image and various commands via a transmission path. In this embodiment, communications are performed mainly with the server 240 shown in FIG. 2.

The image pickup unit 101 converts an optical image of an object into an electrical signal, converts the electrical signal into a digital signal, performs various necessary processes on the digital signal, and supplies the results to the encoder 102 and display unit 105. Upon reception of a record instruction command from the system controller 107, the encoder 102 encodes the digital image data, compresses its data amount, and transmits the encoded image data to the communication processing unit 109. However, in the state that data cannot be transmitted or in the state that the image data transmission process is delayed, the encoder outputs the encoded image data to the recording and reproducing unit 103 to once store it in the recording medium M. If the transmission enable state is recovered thereafter, the system controller 107 controls the recording and reproducing unit 103 to read the image data stored in the recording medium M and transmit it to the communication processing unit 109 and to the server 240. In this embodiment, the encoder 102 compresses the still image data by the JPEG scheme and the moving image data by the MPEG scheme.

The communication processing unit 109 communicates with a wireless base station to transfer and receive data to and from the wireless base station. For example, if image data is received from the encoder 102 or recording and reproducing unit 103, the image data is transmitted, whereas if the data transmission command is received from the system controller 107, the data corresponding to the command is transmitted.

If data such as a command is received from the wireless base station, the communication processing unit 109 transmits the received data to the system controller 107, whereas if the image data is received, it is output to the decoder 104.

A user manipulates the operation unit 108 to instruct a record start and a record stop, edit in accordance with the play list, and the like. The operation unit 108 sends an operation instruction command to the system controller 107 in accordance with the user operation.

The system controller 107 controls the operation of the whole apparatus, and receives an instruction from the operation unit 108 to control the encoder 102, communication processing unit 109 and the like. By executing a play list editing program, play list data is generated and updated.

The decoder 104 receives the image data from the communication processing unit 109, decodes the received image data, and outputs it to the display unit 105 and display picture generating unit 106.

In response to a command from the system controller 108, the display picture generating unit 106 generates various pictures to be displayed on the display unit 105 and outputs them to the display unit 105.

The system controller 107 switches between the image data to be displayed on the display unit 105 in accordance with an instruction from the operation unit 108. Specifically, an image supplied from the image pickup unit 101 during photographing is displayed, an image supplied from the decoder 104 or display picture generating unit 106 during reproduction is displayed, and an image supplied from the display picture generating unit 106 during play list editing is displayed.

Figure 4A:
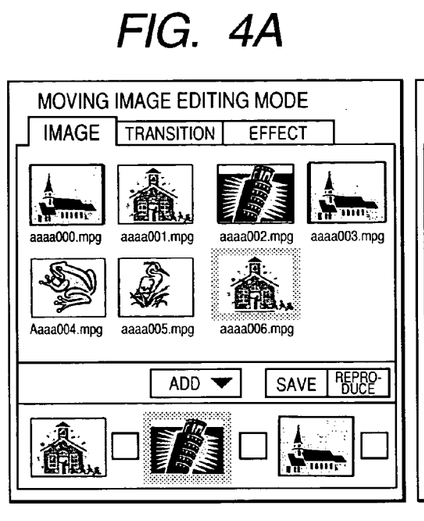
FIGS. 4A, 4B and 4C are diagrams illustrating editing windows.
Figure 4B:
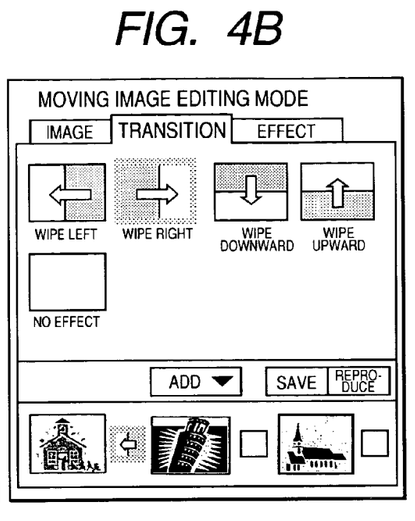
Figure 4C:
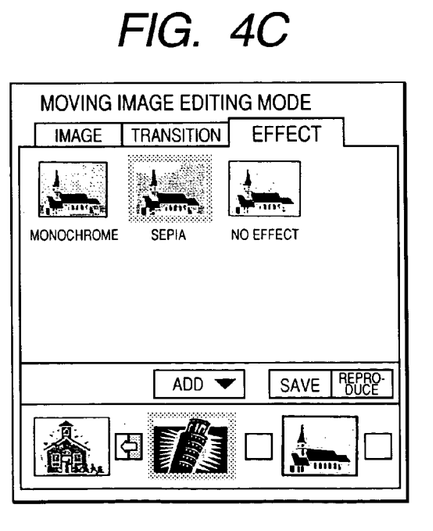

With reference to FIGS. 4A, 4B and 4C, description will be made on the processes of the play list editing program to be executed by the system controller 107 during editing, on display windows during the process and on a user operation procedure.

FIGS. 4A, 4B and 4C show examples of a window displayed on the display unit 105 in the editing mode of the image photographing apparatus 210. As described previously, when the editing mode is instructed by the operation unit 108, a thumbnail image transmission request is sent to the server 240 and the thumbnail image data of the stored image data is received. The received thumbnail image data is stored in a not-shown memory in the communication processing unit 109. Thumbnail list windows shown in FIGS. 4A, 4B and 4C are generated by the display picture generating unit 106 in accordance with the image data received from the server 240 via the communication processing unit 109.

As shown in FIGS. 4A, 4B and 4C, not only the image list can be displayed, but also a transition list and an effect list which can be used during image editing can also be displayed. Switching between these lists can be conducted by using a tab. Switching between tabs and depression of a button are conducted by using a touch panel. Obviously, buttons on the image photographing apparatus itself or other means cam also be used.

In addition to the list display, a story board is displayed under the list display. The story board is widely used in general for image editing, the contents of the story board corresponding to the contents of the play list. The story board indicates the order of reproducing the registered images from the left to right.

The display screen of the story board is constituted of image areas where images are registered and transition areas where transitions are set. The transition area is displayed with various icons for setting the transition corresponding to the screen switching effect, and positioned between adjacent image areas.

Displayed in FIG. 4A is a thumbnail image list of image data. All the thumbnail images are displayed for the image data transmitted from the image photographing apparatus 210 and stored in the server 240. When a user selects one of these thumbnail images by using the touch panel, the selected thumbnail image is surrounded by a bold frame indicating a select state. In this select state, when an "ADD" button lower than under the list display is depressed, the thumbnail image in the select state is added to the image area of the story board. By repeating these processes, a plurality of thumbnail images can be added to the story board. A change in the order of images in the story board is performed by a drag-and-drop operation or the like.

When a "REPRODUCE" button is depressed in the state that the thumbnail image is selected, the system controller 107 instructs the communication processing unit 109 to transmit a reproduction command to the server 240 so that the server 240 transmits the image data corresponding to the designated thumbnail image. After the image data is transmitted from the server 240, the system controller 107 controls the display unit 105 to display the image output from the decoder 104 in place of the editing window shown in FIG. 4A, 4B or 4C.

By depressing the tab, an effect list window and a transition list window can be selected which can be used during editing.

For example, if the transition list is to be displayed, a tab "TRANSITION" is depressed. In this manner, the transition list capable of being used during editing is displayed. FIG. 4B shows the window displaying the transition list.

If the transition is to be added to the story board, first the transition area to be added is selected, and thereafter the transition is selected from the transition list. When the "ADD" button is depressed thereafter, the transaction can be added to the transaction area of the story board.

By depressing the tab, the effect list capable of being used during editing can be displayed. When the effect list is to be displayed, a tab "EFFECT" is depressed so that the effect list capable of being used during editing is displayed. FIG. 4C shows the window displaying the effect list.

When the effect is to be added to the image, first an image to be added with the effect is selected from the images added to the story board, and thereafter an effect is selected from the effect list. Thereafter, the "ADD" button is depressed so that the image selected in the story board can be added with the effect. In order to clearly indicate that the effect is added to the image added in the story board, the effect is added with the thumbnail image. For example, if a monochromatic effect is added, the display picture generating unit 106 monochromatically displays the thumbnail image to be displayed in the story board. An added effect may be indicated to the user by other methods.

By repeating the above-described processes, the user performs image editing by using the story board. When the image editing work is to be terminated, a user depresses a "SAVE" button to store the editing results. When the "SAVE" button is depressed, the system controller 107 generates a play list for reproducing the image data in accordance with the procedure matching the contents of the story board. This play list data is transferred to the server 240 via the communication processing unit 109. The server 240 stores the received play list data in a file.

Next, the structure of the server 240 will be described.

Figure 5:
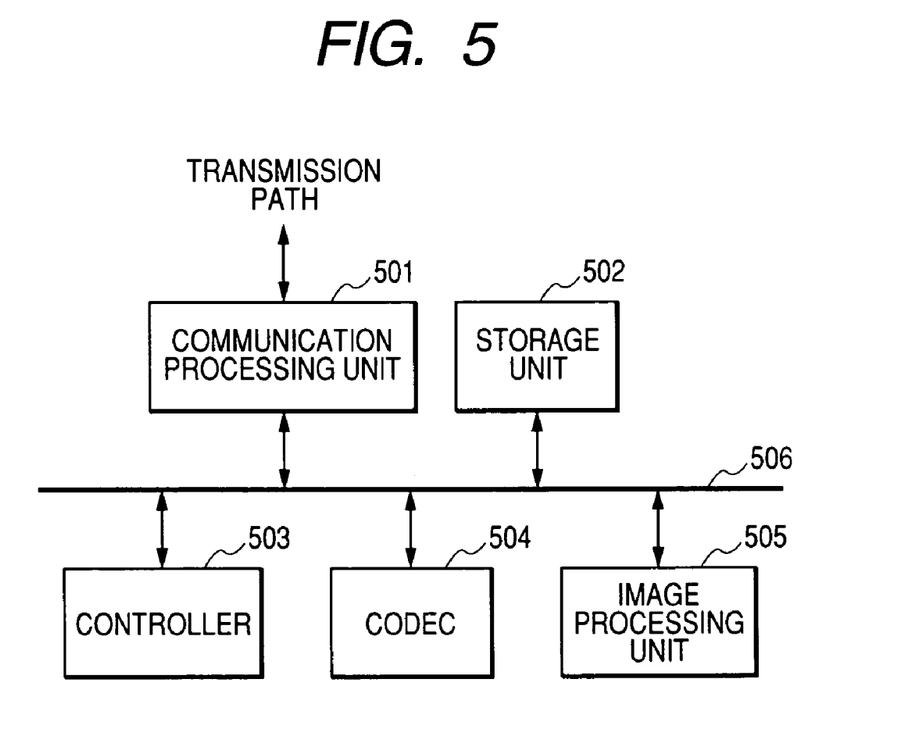
FIG. 5 is a diagram showing the structure of a server.

FIG. 5 is a diagram showing the structure of the server 240. A communication processing unit 501 transmits and receives image data, various commands and the like via a transmission path. A storage 502 stores image data, play list data and the like. A controller 503 transfers data to and from each unit via a bus 506. A codec 504 encodes image data stored in the storage unit 502 and decodes the image data to be processed by an image processing unit 505. The image processing unit 505 performs a process corresponding to each of various processes designated by the play list.

As described earlier, the communication processing unit 501 transmits and receives mainly data to and from the image photographing apparatus 210. For example, when the photographed image data is transmitted, this effect is notified to the controller 503 and the image data is stored in the storage unit 502. The controller 503 stores the received image data along with the additional information such as identification information of the received image data, in the storage unit 502. The controller 503 controls the image processing unit 505 to generate the thumbnail image by using the received image data, and the generated thumbnail image data is also stored in the storage unit 502 together with the original image data and additional information. Upon reception of a reproduction command requesting the thumbnail image data and play list data from the image photographing apparatus 210, the communication processing unit 501 notifies this effect to the controller 503. In accordance with this command, the controller 503 reads the designated image data or play list data from the storage 502. The read image data is transmitted to the image photographing apparatus 210 via the communication processing unit 501.

If the play list data is designated, the contents of the read play list data are checked and if the special effect such as transaction and effect is designated, the image data designated by the play list is read from the storage unit 502 and decoded by the codec 504, and the designated special effect process is performed at the image processing unit 505. After the codec 504 again encodes the image data, the encoded image data is transmitted to the image photographing apparatus 210 via the communication processing unit 501.

As described above, by using the window layout and the window operation method described with reference to FIGS. 4A, 4B and 4C, a user can easily edit an image and generate play list data by using the image photographing apparatus. The above-described embodiment of the invention is only illustrative, and the play list data may be generated by other methods.

In the embodiment, although the effect and transition usable during editing are preset at the image photographing apparatus, the image photographing apparatus may acquire the usable effect list from the server and display it. Although the image effect includes only effect and transition, other editing functions may be added such as text setting and trimming.

Also in this embodiment, although the application for play list editing is possessed by the image photographing apparatus itself, other configurations may be adopted. For example, the server may be a Web application server, and the image photographing apparatus (client) may be a mere Web terminal, to thereby execute a Web application.

With the above-described configuration, an image editing process and a process of reproducing and displaying edition results can be performed even by an image recording system in which photographed image data is automatically transferred to the server and the image data is not left in the digital camera itself.

Since the actual image editing is performed by the server, the client is required only to generate the play list. The client is not therefore required to have a high performance. Further, during the image editing process, the image data is not actually exchanged so that the network load is very small.

In the above-described embodiment, the server generates the thumbnail image data. The invention is not limited only to this, but the image photographing apparatus may generate the thumbnail image data and only this data is recorded in the recording medium M. In this case, the recording and reproducing unit generates the thumbnail image data and the system controller generates identification data (ID) for identifying the image data, reproducing time information and the like and stores them with reference to the thumbnail image data.

During the reproduction, the thumbnail image data recorded in the recording medium M is reproduced and the display picture reproducing unit generates a thumbnail image list.

A user selects a desired thumbnail image from the thumbnail list, and the system controller transmits the reproduction start command for the image data corresponding to the identification data of the selected thumbnail image, to the server.

Also during editing, the window such as shown in FIGS. 4A, 4B and 4C is generated and displayed by using the thumbnail image data recorded in the recording medium M. The image photographing apparatus 210 may generate the thumbnail image data of the generated play list.

The invention is applicable to a system having a plurality of apparatuses such as a host computer, an interface apparatus, a reader and a printer or to a single apparatus (e.g., a copier, a facsimile or the like).

The objects of the invention can be achieved by supplying a storage medium storing software program codes realizing the function of the embodiment described above to a system or apparatus and making a computer (CPU or MPU) of the system or apparatus read and execute the program code stored in the storage medium.

In this case, the software program codes themselves read from the storage medium realize the embodiment function. Therefore, the program codes themselves and the storage medium storing the program codes constitute the present invention.

The storage medium for supplying such program codes may be a ROM, a flexible disk, a hard disk, an optical disk, a magneto optical disk, a CD-ROM, a CD-R, a magnetic tape, a nonvolatile memory card, and the like.

The invention also includes the case wherein not only the computer executes the read program to realize the embodiment function but also an OS (operating system) or the like running on a computer executes a portion or the whole of the actual process to realize the embodiment function.

The invention also includes the case wherein the functions of the embodiment are realized by writing the program codes read from the storage medium into a memory of a function expansion board inserted into a computer or of a function expansion unit connected to the computer, and thereafter by making a CPU of the function expansion board or function expansion unit execute a portion or the whole of actual processes Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing system comprising a server and an imaging apparatus, wherein
the imaging apparatus comprises:
an imaging unit configured to photograph one or more objects and to generate a plurality of image data;
a communication unit configured to communicate with the server;
a control unit configured to control the communication unit to transmit to the server the plurality of image data generated by the imaging unit, and to control the communication unit to receive from the server a plurality of thumbnail image data corresponding to the plurality of image data transmitted to and stored in the server;
an instruction unit configured to select thumbnail image data from among the plurality of thumbnail image data received by the communication unit and to issue a reproduction instruction to reproduce the image data corresponding to the selected thumbnail image data, wherein the control unit controls the communication unit to transmit to the server a reproduction request of the image data corresponding to the selected thumbnail image data in accordance with the reproduction instruction issued by the instruction unit; and an editing unit configured to change a reproduction order of the plurality of image data generated by the imaging unit and stored in the server using the plurality of thumbnail image data received by the communication unit and to generate play list data which is different from the reproduction request and indicates the reproduction order of the plurality of image data, wherein the control unit controls the communication unit to transmit to the server the play list data generated by the editing unit to enable the server to reproduce the plurality of image data in accordance with the reproduction order indicated by the play list data, and the server comprises:

a transceiver unit configured to communicate with the imaging apparatus, a storage unit configured to store the plurality of image data and the play list data transmitted from the imaging apparatus and received by the transceiver unit, a generation unit configured to generate the plurality of thumbnail image data for editing the plurality of image data stored in the storage unit, and a reproduction unit configured to reproduce from the storage unit the image data corresponding to the selected thumbnail image data in accordance with the reproduction request of the image data corresponding to the selected thumbnail image data transmitted from the imaging apparatus and received by the transceiver unit, the reproduction unit reproducing the plurality of image data from the storage unit in accordance with the reproduction order indicated by the play list data stored in the storage unit.

2. An imaging apparatus comprising:

an imaging unit configured to photograph one or more objects and to generate a plurality of image data;

a communication unit configured to communicate with a server;

a control unit configured to control the communication unit to transmit to the server the plurality of image data generated by the imaging unit, and to control the communication unit to receive from the server a plurality of thumbnail image data corresponding to the plurality of image data transmitted to and stored in the server;

an instruction unit configured to select thumbnail image data from among the plurality of thumbnail image data received by the communication unit and to issue a reproduction instruction to reproduce the image data corresponding to the selected thumbnail image data, wherein the control unit controls the communication unit to transmit to the server a reproduction request of the image data corresponding to the selected thumbnail image data in accordance with the reproduction instruction issued by the instruction unit; and an editing unit configured to change a reproduction order of the plurality of image data generated by the imaging unit and stored in the server using the plurality of thumbnail image data received by the communication unit, and to generate play list data which is different from the reproduction request and indicates the reproduction order of the plurality of image data, wherein the control unit controls the communication unit to transmit to the server the play list data generated by the editing unit to enable the server to reproduce the plurality of image data in accordance with the reproduction order indicated by the play list data.

3. An imaging apparatus according to claim 2, further comprising:

a display unit configured to display an editing window for editing the plurality of image data by using the thumbnail image data, the editing unit changing the reproduction order of the plurality of image data by using the editing window displayed by the display unit.

4. An imaging apparatus according to claim 2, wherein the control unit controls the communication unit to receive the thumbnail image data in accordance with an instruction of an editing mode where the editing unit edits the plurality of image data.

5. An imaging apparatus according to claim 2, wherein the editing unit adds an image effect to the image data stored in the server and generates the play list data indicating the image effect added to the image data.

6. An imaging apparatus according to claim 2, further comprising:

a recording unit configured to record the image data generated by the imaging unit in a recording medium, wherein the control unit controls the recording unit to record the image data, if the communication unit cannot transmit the image data to the server.

7. An imaging apparatus according to claim 2, wherein the control unit controls the communication unit to receive the plurality of image data reproduced by the server in accordance with the reproduction order indicated by the play list data.

8. An imaging apparatus according to claim 2, wherein the communication unit communicates with the server by wireless communications.

9. An imaging apparatus according to claim 2, wherein the control unit controls the communication unit to receive the selected image data that the server transmits in accordance with the reproduction request.

10. An imaging apparatus according to claim 2, wherein, if a reproduction instruction to reproduce the play list data is issued by the instruction unit, the control unit controls the communication unit to transmit to the server a reproduction request of the plurality of image data indicated by the play list data.

11. An imaging apparatus according to claim 10, wherein the communication unit receives the thumbnail image data of the play list data from the server, and wherein the instruction unit selects the thumbnail image data of the play list data to issue the reproduction instruction of the play list data.

* * * * *